(12) United States Patent
Thatathil et al.

(10) Patent No.: US 12,473,484 B2
(45) Date of Patent: Nov. 18, 2025

(54) POLYMER BLENDS FOR USE IN WELLBORE APPLICATIONS

(71) Applicant: Halliburton Energy Services, Inc., Houston, TX (US)

(72) Inventors: Sandeep Thatathil, Singapore (SG); Shashwat Shukla, Singapore (SG); Arpana Singh, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/657,276

(22) Filed: May 7, 2024

(65) Prior Publication Data
US 2024/0287377 A1 Aug. 29, 2024

Related U.S. Application Data

(62) Division of application No. 17/474,592, filed on Sep. 14, 2021, now Pat. No. 11,999,897.

(51) Int. Cl.
| | |
|---|---|
| *C08F 10/06* | (2006.01) |
| *C08F 14/26* | (2006.01) |
| *C08F 14/28* | (2006.01) |
| *C08L 15/02* | (2006.01) |
| *C09K 8/508* | (2006.01) |

(52) U.S. Cl.
CPC ............ *C09K 8/5083* (2013.01); *C08F 10/06* (2013.01); *C08F 14/26* (2013.01); *C08F 14/28* (2013.01); *C08L 15/02* (2013.01)

(58) Field of Classification Search
CPC ........ C09K 8/5083; C08F 10/06; C08F 14/26; C08F 14/28; C08L 15/02; C08L 2205/02; C08L 27/16; C08L 27/18
See application file for complete search history.

(56) References Cited

U.S. PATENT DOCUMENTS

| | | | |
|---|---|---|---|
| 6,624,251 B1 * | 9/2003 | Chmielewski | .......... C08L 27/16 524/544 |
| 7,696,275 B2 | 4/2010 | Slay et al. | |
| 2005/0161212 A1 | 7/2005 | Leismer et al. | |
| 2005/0222337 A1 * | 10/2005 | Park | .......................... C08J 3/24 525/199 |
| 2008/0076873 A1 | 3/2008 | Ogata et al. | |
| 2009/0011164 A1 | 1/2009 | Masuda et al. | |
| 2009/0054593 A1 | 2/2009 | Funaki et al. | |
| 2009/0202769 A1 | 8/2009 | Masuda et al. | |
| 2013/0197163 A1 | 8/2013 | Apostolo et al. | |
| 2014/0154454 A1 | 6/2014 | Ueki et al. | |
| 2016/0194491 A1 | 7/2016 | Taguchi et al. | |

FOREIGN PATENT DOCUMENTS

| | | | |
|---|---|---|---|
| CN | 106633544 A | 5/2017 | |
| CN | 112625386 A | 4/2021 | |
| EP | 1260550 A1 | 11/2002 | |
| EP | 3798260 A1 * | 3/2021 | .......... C08F 214/184 |
| GB | 2462389 A | 2/2010 | |
| JP | 2016132754 A | 7/2016 | |
| WO | 2009020182 A1 | 2/2009 | |
| WO | 2013141253 A1 | 9/2013 | |

OTHER PUBLICATIONS

Denmark Patent Application No. PA 2024 30041, Office Action mailed Jul. 11, 2024, 8 pages.
Danish Patent Application No. PA 2024 30041, Office Action mailed Nov. 15, 2024, 6 pages.

* cited by examiner

*Primary Examiner* — Kumar R Bhushan
(74) *Attorney, Agent, or Firm* — Kilpatrick Townsend & Stockton LLP

(57) ABSTRACT

The present disclosure provides elastomer blends comprising mixtures of partially fluorinated elastomers, such as tetrafluoroethylene propylene elastomers (FEPM or TFEP) and fluorocarbon rubbers, such as vinylidene fluoride-based elastomers (FKM or FEP). The elastomer blends can be prepared using two-roll mills, internal mixers, or other mixing technique and can be molded into seals, gaskets, o-rings or other articles using extrusion, injection molding, compression molding or the like. The resultant elastomeric articles can provide good sealing performance, including at moderate or low temperatures, and exhibit good chemical compatibility and resistance when exposed to common wellbore environments. In some cases, the elastomer blends can provide performance characteristics previously only available from perfluorinated elastomers (FFKM), but without requiring the complex processing conditions associated with preparing perfluorinated elastomers.

6 Claims, 3 Drawing Sheets

POLYMER BLENDS FOR USE IN WELLBORE APPLICATIONS

CROSS REFERENCE TO RELATED APPLICATIONS

The present application is a divisional application of U.S. application Ser. No. 17/474,592, entitled, "POLYMER BLENDS FOR USE IN WELLBORE APPLICATIONS," and filed Sep. 14, 2021, the entirety of which is incorporated by reference herein.

TECHNICAL FIELD

The present disclosure relates generally to polymeric materials, methods of making polymeric materials, and devices comprising polymeric materials for use in wellbores in subterranean formations and wellbore operations and, more particularly (although not necessarily exclusively), to chemically resistant elastomer blends and associated methods and devices for use in a variety of different wellbore environments and wellbore operations.

BACKGROUND

Elastomers are a useful part of any sealing system due to their visco-elastic properties. A wide variety of elastomers are used in oil and gas applications, such as for packer elements, molded seals, O-rings, or the like, to provide or improve sealing performance. Elastomer selection becomes a challenge due to the chemical and thermal compatibility with the well conditions and fluids used in the well. Perfluorinated elastomers, also referred to as FFKM or FFPM, generally have excellent chemical compatibility and thermal performance. Use of perfluorinated elastomers is limited, however, as their manufacturing and processing is complex and difficult, resulting in high cost and limited availability.

DETAILED DESCRIPTION

Figure 1:
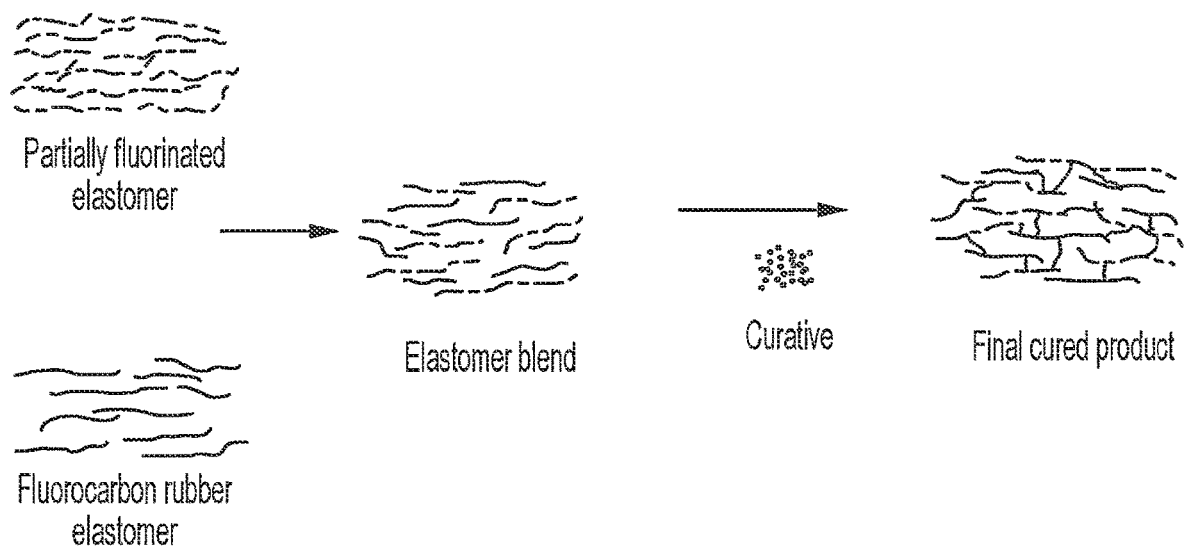
FIG. 1 provides a schematic representation of blending and curing elastomers according to one example of the present disclosure.

Certain aspects and examples of the present disclosure relate to elastomers that provide good sealing performance, including at moderate or low temperatures and or at moderate or high pressures (e.g., up to 5000 psi), and exhibit good chemical compatibility and resistance when exposed to common wellbore environments, and that are manufacturable without the use of complex processing. Example elastomers that can provide such performance characteristics include blends of partially fluorinated elastomers, (e.g., tetrafluoroethylene propylene elastomers, FEPM, or TFEP) and fluorocarbon rubbers (e.g., vinylidene fluoride-based elastomers, FKM, or FEP), such as low-temperature fluorocarbon rubbers. The disclosed elastomers are useful in wellbores, wellbore environments, or during wellbore operations.

While partially fluorinated elastomers and fluorocarbon rubbers contain polymer chains including fluorine, these materials are different from perfluorinated elastomers (FFKM or FFPM). In perfluorinated elastomers, the polymer chains are fully fluorinated, making the chains chemically very inert due the high stability of carbon-fluorine bonds. In comparison, partially fluorinated elastomers and fluorocarbon rubbers have polymer chains that include some amount of carbon-hydrogen bonds, and the inclusion of such bonds can result in increased reactivity compared to perfluorinated elastomers.

For example, while partially fluorinated elastomers, like tetrafluoroethylene propylene elastomers, generally have good chemical resistance to hydrogen sulfide ($H_2S$) and formates, such elastomers may not be compatible with aromatic hydrocarbons or diesel, and may degrade or swell in the presence of aromatic hydrocarbons or diesel, for example. This limits the ability of partially fluorinated elastomers like tetrafluoroethylene propylene elastomers to be used for sealing purposes in some wellbore environments, such as where aromatic hydrocarbons or diesel are present. In some examples, tetrafluoroethylene propylene elastomers can exhibit good sealing performance at relatively high temperatures, such as greater than about 37° C. and up to 200° C. or more, but their sealing ability at relatively low temperatures, such as less than about 37° C. can be limited.

Fluorocarbon rubbers, on the other hand, are available in a variety of grades and comprising a variety of different monomers that allow good sealing performance at low temperatures, such as less than 37° C. and even to temperatures around or below 0° C. Fluorocarbon rubbers also are generally chemically resistant against aromatic fluids, but these materials are commonly vulnerable to $H_2S$, formates, and amines, and have poor compatibility to high pH environments (e.g., pH of about 8 or greater). This limits the ability of fluorocarbon rubbers to be used for sealing purposes in some wellbore environments, such as where $H_2S$ is present in high concentrations (e.g., above 5%), or where formates, amines, or well fluids above pH 8 are present.

Using elastomers that are blends of partially fluorinated elastomers (e.g., tetrafluoroethylene propylene elastomers) and fluorocarbon rubber, however, can provide for good sealing performance under pressure (e.g., up to 5000 psi or more) at low temperatures and chemical compatibility across a wide variety of conditions and wellbore environments, making such blended elastomers useful in wellbore environments where only perfluorinated elastomers have been conventionally used. The different components and their proportions can selected in such a way that the final product's properties can meet the sealing performance requirements without significantly affecting the chemical resistance properties of the original elastomers and but can allow the vulnerabilities of the original elastomers to be overcome. The use of partially fluorinated elastomers and fluorocarbon rubbers in the blends also ensures that the required processing does not add significant complexity to the preparation methods, allowing the blended elastomers to be prepared efficiently using available technology and without requiring special handling or processing facilities. In some cases, the blended elastomers may exhibit good sealing performance under pressure (e.g., up to 5000 psi or more) at temperatures of 0° C. or greater (e.g., 0° C. to 37°

C. or 37° C. to 75° C.) and exhibit stability to or compatibility with formates, $H_2S$, PH of 8 or over, amines, aromatic hydrocarbons, and/or diesel.

Partially fluorinated elastomers and fluorocarbon rubbers used in the present blends may have same or compatible cure systems, so that there can be both inter and intra molecular cross-linking achieved during blending and curing. FIG. 1 provides a schematic illustration showing blending and curing elastomers. Initially, the partially fluorinated elastomer and a fluorocarbon rubber elastomer can be blended, such as in the gum rubber state, to form a homogenous mixture where the different polymer chains of the different elastomers are distributed. Following blending, the elastomers can be mixed or treated with a curative to form a final cured product where the different polymer chains and monomer components of the partially fluorinated elastomer and a fluorocarbon rubber elastomer are cross-linked and/or covalently linked among each other, forming a final product that includes polymer chains having features of the original polymer chains present in the partially fluorinated elastomer and the fluorocarbon rubber elastomer. Such a material can exhibit synergistic properties of both the partially fluorinated elastomer and the fluorocarbon rubber elastomer and overcome the deficiencies of either elastomer alone.

In some examples, the blended elastomer may be designed with relatively high composition of a partially fluorinated elastomer and a relatively low composition of a fluorocarbon rubber. In other examples, the blended elastomer may be designed with relatively low composition of a partially fluorinated elastomer and a relatively high composition of a fluorocarbon rubber. Optionally, the partially fluorinated elastomer may comprise from 15% to 85% of the blend, by weight, such as from 15% to 20%, from 20% to 25%, from 25% to 30%, from 25% to 30%, from 30% to 35%, from 35% to 40%, from 40% to 45%, from 45% to 50%, from 50% to 55%, from 55% to 60%, from 60% to 65%, from 65% to 70%, from 70% to 75%, from 75% to 80%, or from 80% to 85%. Optionally, the fluorocarbon rubber comprises from 15% to 85% of the blend, by weight, such as from 15% to 20%, from 20% to 25%, from 25% to 30%, from 25% to 30%, from 30% to 35%, from 35% to 40%, from 40% to 45%, from 45% to 50%, from 50% to 55%, from 55% to 60%, from 60% to 65%, from 65% to 70%, from 70% to 75%, from 75% to 80%, or from 80% to 85%.

The specific elastomers and proportion of elastomers is the blends may be selected in such a way that the blend's Mooney viscosity is maintained at a suitable level, which can affect the modulus of the final product. For example, the modulus properties can be important in sealing performance—a higher modulus offers a good extrusion resistance when used in a seal. Sealing performance as a function of temperature may be explained in terms of the glass transition temperature, $T_g$. At temperatures above the glass transition temperature, an elastomer may have a viscous or rubbery behavior, where it can achieve good sealing performance. Conversely, at temperatures below the glass transition temperature, an elastomer may exhibit a hard and relatively brittle behavior, limiting the ability of the elastomer to fill and achieve a seal. In some cases, plasticizers are used to reduce a glass transition temperature. However, commercially available plasticizers are generally not compatible with partially fluorinated elastomers, like tetrafluoroethylene propylene elastomers, and plasticizers may be lost due to extraction or volatilization during polymer crosslinking.

Figure 2:
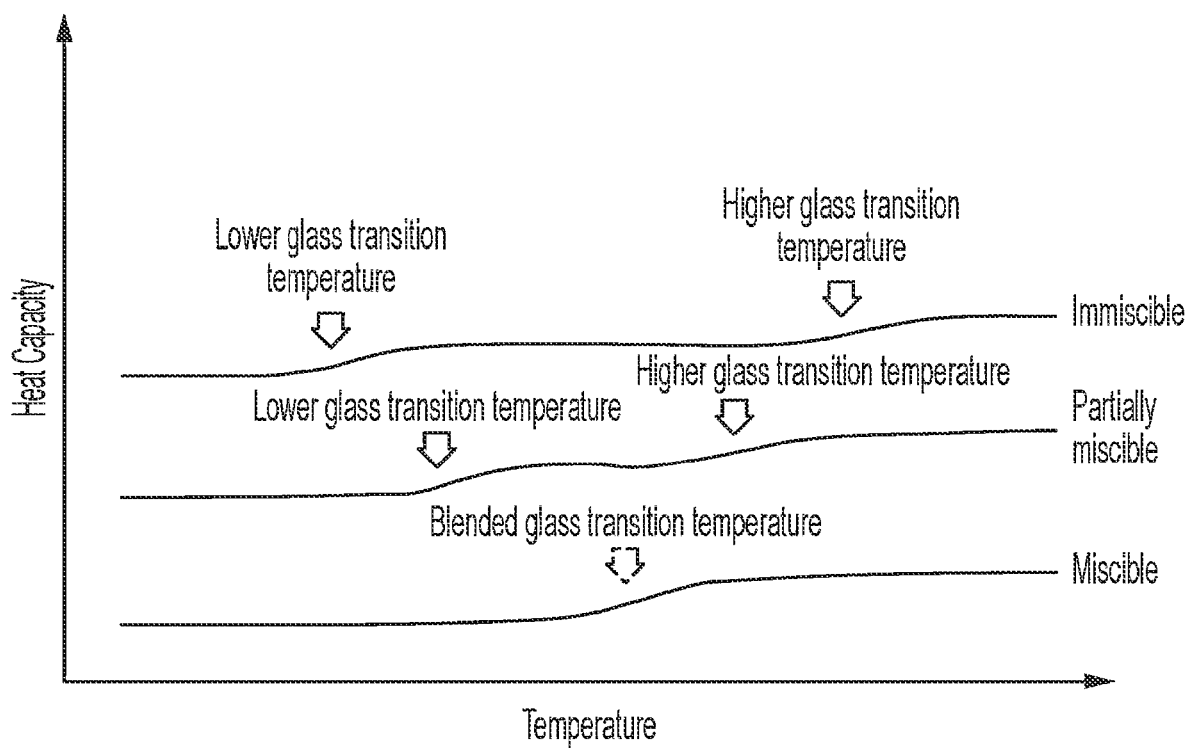
FIG. 2 provides examples of glass transition temperatures for blends of immiscible, partially miscible, and miscible elastomers, according to examples of the present disclosure.

In some examples, partially fluorinated elastomers and fluorocarbon rubber elastomers may be immiscible. When two immiscible polymers are blended together, the final product may have two different glass transition temperature values. FIG. 2 provides a plot showing example heat capacity or heat flow, such as obtained using differential scanning calorimetry, as a function of temperature for immiscible elastomers, partially miscible elastomers, and fully miscible elastomers, indicating how the glass transition temperature changes as elastomer blends change from immiscible to miscible. For blends of immiscible elastomers, two distinct glass transitions are present, with glass transition temperatures close to those of the isolated elastomers. For blends of partially miscible elastomers, two glass transitions may be evident, with temperatures shifted from the isolated elastomers. For blends of fully miscible elastomers, the resultant blend exhibits a single glass transition temperature between the glass transition temperatures of the isolated elastomers. Since the blending and curing of immiscible elastomers creates cross linking between a high glass transition temperature material and a low glass transition temperature material, this can help to maintain the flexibility of the blends at temperatures lower than the high transition temperature material, resulting in a blend that has a flexible component even at temperatures lower than the higher glass transition material. In the case of blends of partially fluorinated elastomers and fluorinated rubber elastomers, the higher glass transition temperature may represent or correspond to the partially fluorinated elastomer, while the lower glass transition temperature may represent or correspond to the fluorine rubber elastomer. Such a dual glass transition can result in the blended elastomer exhibiting a good sealing property at low temperatures, such as about 5° C. or less.

In a specific aspect, elastomers comprising a blend of partially fluorinated elastomers and fluorocarbon rubber elastomers are provided. The elastomers of this aspect may be useful for preparing elastomeric articles, such as seals, which may be used in wellbores, wellbore environments, or during wellbore operations. For example, an elastomeric article or seal may be in the form of or comprise a packer element, a molded seal, an o-ring, or a gasket.

Figure 3:
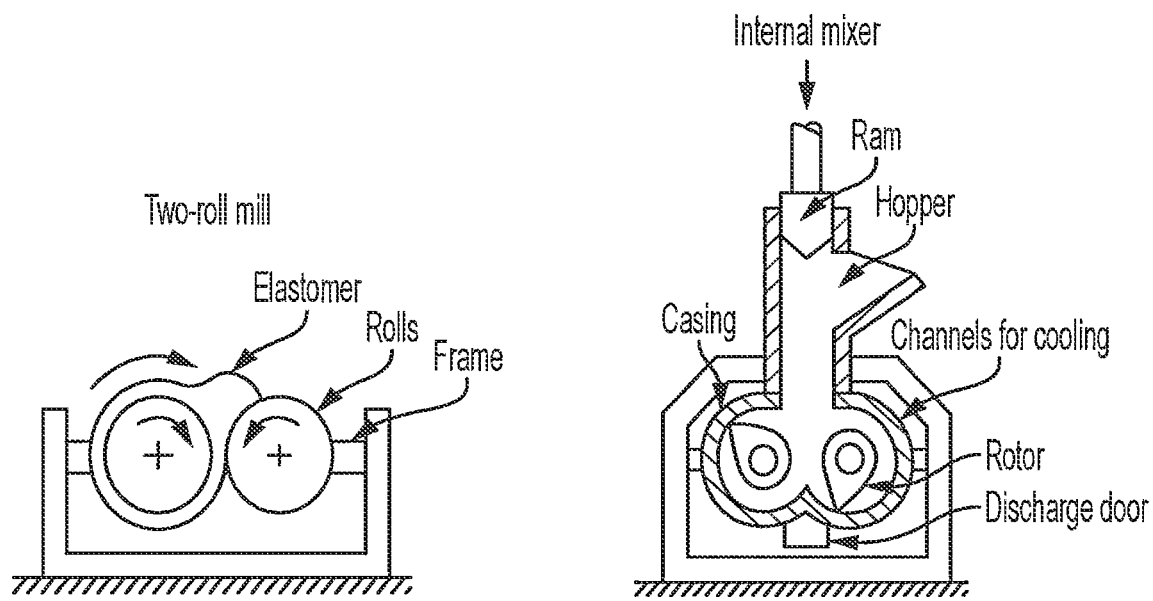
FIG. 3 provides a schematic illustration of two devices that may be used for blending elastomers, according to examples of the present disclosure.

In some examples, the elastomers may be prepared by providing a partially fluorinated elastomer and a fluorocarbon rubber elastomer and blending or compounding the partially fluorinated elastomer and the fluorocarbon rubber elastomer to generate an elastomer blend. The fluorinated elastomer and the fluorocarbon rubber elastomer may be blended by subjecting the fluorinated elastomer in a gum rubber state and the fluorocarbon rubber elastomer in a gum rubber state to shear forces to intermix the elastomers. FIG. 3 provides a schematic illustration of two devices that may be used for blending the elastomers, in some embodiments. On the left, a two-roll mill is depicted; on the right, an internal mixer is depicted. These devices may be loaded with appropriate amounts of the partially fluorinated elastomer and the fluorocarbon rubber elastomer and may subject the elastomers to shear forces to intermix the components, such as to generate a homogeneous blend. In some examples, elastomeric articles may be prepared from the blended elastomer by extruding, using brabender, or the like. Reinforcing fillers, curatives, and/or other additives to optimize the standard properties may optionally be incorporated into the blend using the same internal mixing or two roll mill.

The elastomer blend so produced may be subjected to a curing process after blending. Optionally the elastomer blend may be subjected to a rest or maturation time prior to curing. Optionally, the curing process may comprise adding a curative agent to the elastomer blend. Optionally, the curing process may comprise developing the cross link in the polymer by way of a chemical reaction between a curative agent and functional groups of components of the elastomer blend. Example curative agents include, but are not limited to a bisphenol, an amine, a peroxide, an isocyanate, or a lead oxide. In some examples, peroxides useful as curative agents include, but are not limited to organic peroxides, such as di cumyl peroxide or 1,3-bis(tert-butylperoxyisopropyl)benzene. In some examples, a bisphenol useful as a curative agent includes bisphenol hexafluoroisopropylidene-bis (4-hydroxy benzene). In some examples, adding the curative agent may include adding the curative agent to the elastomer blend in the two-roll mill or the intermixer and subjecting the curative agent and the elastomer blend to additional processing in the two-roll mill or the intermixer.

Figure 4:
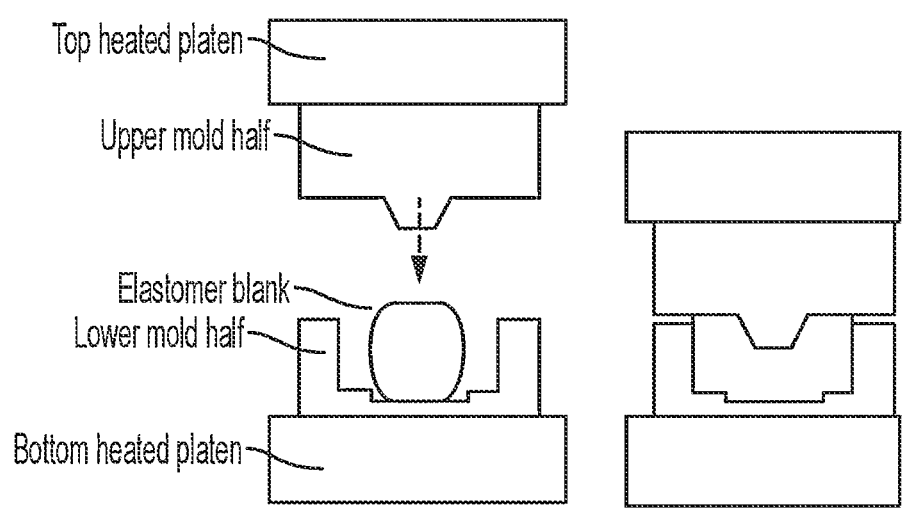
FIG. 4 provides a schematic illustration of a compression molding process according to examples of the present disclosure.

Curing may also comprise subjecting the compounded elastomer blend to a vulcanization process, which may include applying heat and/or pressure to the elastomer blend. FIG. 4 provides a schematic illustration of a compression molding process which may be used to perform vulcanization or final curing of a sample or blank of the elastomer blend. In some examples, the elastomer blend may be subjected to a extrusion process to generate a blank of the elastomer blend, which may be loaded into a compression mold. The elastomer blank may then be heated and subjected to pressure or forming processes to shape the elastomer into an elastomeric article.

Various partially fluorinated elastomers are useful with the elastomer blends described herein. For example, the partially fluorinated elastomer may comprise tetrofluoroethylene monomers and propylene monomers. Optionally, the partially fluorinated elastomer may be an FEPM elastomer. Optionally, the partially fluorinated elastomer may further comprise perfluoromethyl vinyl ether monomers or ethylene monomers. Monomers of the partially fluorinated elastomer may be in a polymerized or cross-linked state. The partially fluorinated elastomer may exhibit a glass transition temperature of from $-15°$ C. to $5°$ C., such as from $-15°$ C. to $-10°$ C., from $-10°$ C. to $-5°$ C., from $-5°$ C. to $0°$ C., or from $0°$ C. to $5°$ C.

Various fluorocarbon rubber elastomers are useful with the elastomer blends described herein. For example, the fluorocarbon rubber may comprise vinylidene fluoride monomers. Optionally, the fluorocarbon rubber may be an FKM elastomer. Optionally, the fluorocarbon rubber elastomer may further comprise hexafluoropropylene monomers, tetrafluoroethylene monomers, propylene monomers, or perfluoromethyl vinyl ether monomers. Monomers of the fluorocarbon rubber elastomer may be in a polymerized or cross-linked state. The fluorocarbon rubber elastomer may exhibit a glass transition temperature of from $-40°$ C. to $-5°$ C., such as from $-40°$ C. to $-35°$ C., from $-35°$ C. to $-30°$ C., from $-30°$ C. to $-25°$ C., from $-25°$ C. to $-20°$ C., from $-20°$ C. to $-15°$ C., from $-15°$ C. to $-10°$ C., or from $-10°$ C. to $-5°$ C. In some example, the fluorocarbon rubber may comprise a low-temperature grade fluorocarbon rubber, such as having a glass transition temperature of from $-40°$ C. to $-20°$ C., such as from $-40°$ C. to $-35°$ C., from $-35°$ C. to $-30°$ C., from $-30°$ C. to $-25°$ C., or from $-25°$ C. to $-20°$ C.

The partially fluorinated elastomer and the fluorocarbon rubber elastomer may be present in the elastomer blend in any suitable amounts. In some examples, the partially fluorinated elastomer comprises from 15% to 85% of the blend, by weight. In some examples, the fluorocarbon rubber elastomer comprises from 15% to 85% of the blend, by weight. In some examples, the partially fluorinated elastomer and the fluorocarbon rubber elastomer may be homogeneously distributed in the blend. In some examples, the partially fluorinated elastomer and the fluorocarbon rubber elastomer are cross-linked in the blend. In some examples, monomer components of the partially fluorinated elastomer and monomer components of the fluorocarbon rubber elastomer are cross-linked. The elastomer comprising a blend and/or a cross-linked blend of the partially fluorinated elastomer and the fluorocarbon rubber elastomer may exhibit a first glass transition temperature at a first temperature of from $-40°$ C. to $-5°$ C. and a second glass transition temperature at a second temperature of from $-5°$ C. to $5°$ C.

Optionally, one or more additives or reinforcing fillers (e.g., different from the standard compounding ingredients) may be mixed into or with the blended elastomer, such as in an amount of from 0% to 25%, by weight, such as from 0% to 5%, from 5% to 10%, from 10% to 15%, from 15% to 20%, or from 20% to 25%. In some examples, carbon nanotubes are provided as an additive. Carbon nanotubes, for example, may be useful for increasing the tensile properties of the elastomer blend compared to the same elastomer blend without carbon nanotubes. In some examples hydrin elastomers may be mixed into or with the blended elastomer. In some examples, hydrin elastomers may comprise polymers of epichlorhydrin monomers, for example. In some examples, hydrin elastomers may comprise copolymers of epichlorhydrin monomers and ethylene oxide monomers. In some examples, hydrin elastomers may comprise copolymers of epichlorhydrin monomers and allyl glycidyl ether monomers. In some examples, hydrin elastomers may comprise terpolymers of epichlorhydrin monomers, ethylene oxide monomers, and allyl glycidyl ether monomers. In some examples halobutyl rubber elastomers may be mixed into or with the blended elastomer. In some examples, halobutyl rubber elastomers may comprise isobutylene monomers and isoprene monomers, either or both of which may include halogen substituents (e.g., chlorine or bromine). In some examples EPDM rubber elastomers may be mixed into or with the blended elastomer. In some examples, EPDM rubber elastomers may comprise saturated polyethylene polymers. In some examples, EPDM rubber elastomers may comprise a copolymer of ethylene, propylene, and or diene monomers. In some examples, carbon black may be mixed into or with the blended elastomer. In some examples, silica may be mixed into or with the blended elastomer.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure. Aspects of the invention may be further understood by reference to the following non-limiting examples.

Example 1

A polymer blend of an FKM fluorocarbon rubber and a FEPM partially fluorinated elastomer is prepared with approximately 30% FKM and approximately 70% FEPM, by weight. Appropriate amounts of FKM and FEPM at the gum rubber stage are mixed using a two-roll mill until a homogenous material is obtained. A peroxide curative agent is added to the mixture and subjected to further processing using the two-roll mill. Following blending, samples of the blended elastomer are obtained using an extrusion process. The extruded material is molded into an o-ring using a compression molding process. The resulting o-ring exhibits excellent sealing performance under pressure (e.g., at pressures up to 5000 psi) at temperatures of about 20° C. or more and exhibits strong $H_2S$ resistance and strong compatibility with formate-containing and high pH environments and moderate resistance against aromatic fluids.

Example 2

A polymer blend of an FKM fluorocarbon rubber and a FEPM partially fluorinated elastomer is prepared with approximately 50% FKM and approximately 50% FEPM, by weight. Appropriate amounts of FKM and FEPM at the gum rubber stage are mixed using a two-roll mill until a homogenous material is obtained. A peroxide curative agent is added to the mixture and subjected to further processing using the two-roll mill. Following blending, samples of the blended elastomer are obtained using an extrusion process. The extruded material i molded into an o-ring using a compression molding process. The resulting o-ring exhibits good sealing performance under pressure (e.g., at pressures up to 5000 psi) at temperatures of about 20° C. or more and exhibits good $H_2S$ resistance and good compatibility with formate-containing, aromatic fluid-containing, and high pH environments.

Example 3

A polymer blend of an FKM fluorocarbon rubber and a FEPM partially fluorinated elastomer is prepared with approximately 65% FKM and approximately 35% FEPM, by weight. Appropriate amounts of FKM and FEPM at the gum rubber stage are mixed using a two-roll mill until a homogenous material is obtained. A peroxide curative agent was added to the mixture and subjected to further processing using the two-roll mill. Following blending, samples of the blended elastomer are obtained using an extrusion process. The extruded material is molded into an o-ring using a compression molding process. The resulting o-ring exhibits good sealing performance under pressure (e.g., at pressures up to 5000 psi) at temperatures of about 0° C. or more and exhibits strong compatibility with aromatic fluids, moderate $H_2S$ resistance, and moderate compatibility with formate and high pH environments.

Example 4

A polymer blend of an low-temperature (LT) FKM fluorocarbon rubber and a FEPM partially fluorinated elastomer is prepared with approximately 30% LT-FKM and approximately 70% FEPM, by weight. Appropriate amounts of LT-FKM and FEPM at the gum rubber stage are mixed using a two-roll mill until a homogenous material is obtained. A peroxide curative agent is added to the mixture and subjected to further processing using the two-roll mill. Following blending, samples of the blended elastomer are obtained using an extrusion process. The extruded material is molded into an o-ring using a compression molding process. The resulting o-ring exhibits excellent sealing performance under pressure (e.g., at pressures up to 5000 psi) at temperatures of about 8° C. or more and exhibits strong $H_2S$ resistance and strong compatibility with formate-containing and high pH environments and moderate resistance against aromatic fluids.

Example 5

A polymer blend of an low-temperature (LT) FKM fluorocarbon rubber and a FEPM partially fluorinated elastomer is prepared with approximately 50% LT-FKM and approximately 50% FEPM, by weight. Appropriate amounts of LT-FKM and FEPM at the gum rubber stage are mixed using a two-roll mill until a homogenous material is obtained. A peroxide curative agent is added to the mixture and subjected to further processing using the two-roll mill. Following blending, samples of the blended elastomer are obtained using an extrusion process. The extruded material is molded into an o-ring using a compression molding process. The resulting o-ring exhibits good sealing performance under pressure (e.g., at pressures up to 5000 psi) at temperatures of about 8° C. or more and exhibits good $H_2S$ resistance and good compatibility with formate-containing, aromatic fluid-containing, and high pH environments.

Example 6

A polymer blend of an low-temperature (LT) FKM fluorocarbon rubber and a FEPM partially fluorinated elastomer is prepared with approximately 65% LT-FKM and approximately 35% FEPM, by weight. Appropriate amounts of LT-FKM and FEPM at the gum rubber stage are mixed using a two-roll mill until a homogenous material is obtained. A peroxide curative agent is added to the mixture and subjected to further processing using the two-roll mill. Following blending, samples of the blended elastomer are obtained using an extrusion process. The extruded material is molded into an o-ring using a compression molding process. The resulting o-ring exhibits good sealing performance under pressure (e.g., at pressures up to 5000 psi) at temperatures of about 0° C. or more and exhibits strong compatibility with aromatic fluids, moderate $H_2S$ resistance, and moderate compatibility with formate and high pH environments.

ADDITIONAL EXAMPLES

As used below, any reference to a series of examples is to be understood as a reference to each of those examples disjunctively (e.g., "Examples 1-4" is to be understood as "Examples 1, 2, 3, or 4").

Example 1 is an elastomer, optionally for use in a wellbore or wellbore operation, comprising a blend of: a partially fluorinated elastomer; and a fluorocarbon rubber elastomer.

Example 2 is the elastomer of example 1, wherein the partially fluorinated elastomer the fluorocarbon rubber elastomer are cross-linked in the blend.

Example 3 is the elastomer of example(s) 1-2, wherein the partially fluorinated elastomer and the fluorocarbon rubber elastomer are homogeneously distributed in the blend.

Example 4 is the elastomer of example(s) 1-3, wherein the partially fluorinated elastomer comprises tetrofluoroethylene monomers and propylene monomers.

Example 5 is the elastomer of example 4, wherein the partially fluorinated elastomer further comprises perfluoromethyl vinyl ether monomers or ethylene monomers.

Example 6 is the elastomer of example(s) 1-5, wherein the partially fluorinated elastomer exhibits a glass transition temperature of from −15° C. to 5° C.

Example 7 is the elastomer of example(s) 1-6, wherein the fluorocarbon rubber elastomer comprises vinylidene fluoride monomers.

Example 8 is the elastomer of example 7, wherein the fluorocarbon rubber elastomer further comprises hexafluoropropylene monomers, tetrafluoroethylene monomers, propylene monomers, or perfluoromethyl vinyl ether monomers.

Example 9 is the elastomer of example(s) 1-8, wherein the fluorocarbon rubber elastomer exhibits a glass transition temperature of from −40° C. to −5° C., or wherein the fluorocarbon rubber elastomer comprises a low-temperature grade fluorocarbon rubber, having a glass transition temperature of from −40° C. to −20° C.

Example 10 is the elastomer of example(s) 1-9, wherein the partially fluorinated elastomer comprises from 15% to 85% of the blend, by weight, and wherein the fluorocarbon rubber elastomer comprises from 15% to 85% of the blend, by weight.

Example 11 is the elastomer of example(s) 1-10, exhibiting a first glass transition temperature at a first temperature of from −40° C. to −5° C. and a second glass transition temperature at a second temperature of from −5° C. to 5° C.

Example 12 is the elastomer of example(s) 1-11, further comprising: one or more additives selected from the group consisting of carbon nanotubes, a hydrin elastomer, a halobutyl rubber elastomer, and an EPDM rubber elastomer; or one or more reinforcing fillers selected from the group of carbon black or silica.

Example 13 is a method, optionally a method of making an elastomer blend for use in a wellbore or wellbore operation, the method comprising: providing a partially fluorinated elastomer; providing a fluorocarbon rubber elastomer; blending the partially fluorinated elastomer and the fluorocarbon rubber elastomer to generate an elastomer blend; and subjecting the elastomer blend to a curing process.

Example 14 is the method of example 13, wherein blending comprises subjecting the partially fluorinated elastomer in a gum rubber state and the fluorocarbon rubber elastomer in a gum rubber state to shear forces to intermix the partially fluorinated elastomer and the fluorocarbon rubber elastomer.

Example 15 is the method of example(s) 13-14, wherein blending comprises mixing the partially fluorinated elastomer and the fluorocarbon rubber elastomer using a two-roll mill, a blender, an extruder, or an internal mixer.

Example 16 is the method of example(s) 13-15, wherein the curing process comprises adding a curative agent, a reinforcing, filler, or an additive to the elastomer blend.

Example 17 is the method of example(s) 16, wherein the curative agent comprises a bisphenol, an amine, a peroxide, an isocyanate, or a lead oxide.

Example 18 is the method of example(s) 13-17, wherein the curing process comprises subjecting the elastomer blend to a vulcanization process.

Example 19 is the method of example(s) 13-17, wherein the elastomer blend comprises the elastomer of example(s) 1-12.

Example 20 is an elastomeric article, optionally for use in a wellbore or wellbore operation), in the form of a seal comprising a blend of: a partially fluorinated elastomer; and a fluorocarbon rubber elastomer.

Example 21 is the elastomeric seal of example 20, wherein the seal comprises a packer element, a molded seal, an o-ring, or a gasket.

Example 22 is the elastomeric seal of example(s) 20-21, wherein the seal comprises the elastomer of example(s) 1-12.

Example 23 is the elastomeric seal of example(s) 20-22, prepared according to the method of example(s) 13-19.

Example 24 is the elastomer of example(s) 1-12, prepared according to the method of example(s) 13-19.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method of making an elastomer blend for use in a wellbore or wellbore operation, the method comprising:
   providing a first elastomer;
   providing a second elastomer;
   blending the first elastomer and the second elastomer to generate an immiscible elastomer blend having a first transition temperature of from −40° C. to −5° C. and a second glass transition temperature at a second temperature of from −15° C. to 5° C.; and
   subjecting the elastomer blend to a curing process, wherein the first elastomer consists of a partially fluorinated elastomer and the second elastomer consists of a fluorocarbon rubber elastomer.

2. The method of claim 1, wherein blending comprises subjecting the partially fluorinated elastomer in a gum rubber state and the fluorocarbon rubber elastomer in a gum rubber state to shear forces to intermix the partially fluorinated elastomer and the fluorocarbon rubber elastomer.

3. The method of claim 1, wherein blending comprises mixing the partially fluorinated elastomer and the fluorocarbon rubber elastomer using a two-roll mill, a blender, an extruder, or an internal mixer.

4. The method of claim 1, wherein the curing process comprises adding a curative agent, a reinforcing, filler, or an additive to the elastomer blend.

5. The method of claim 4, wherein the curative agent comprises a bisphenol, an amine, a peroxide, an isocyanate, or a lead oxide.

6. The method of claim 1, wherein the curing process comprises subjecting the elastomer blend to a vulcanization process.

* * * * *